Jan. 18, 1966  R. R. SHAW  3,229,573
PLATFORM FOR OPAQUE PROJECTOR
Filed May 12, 1964
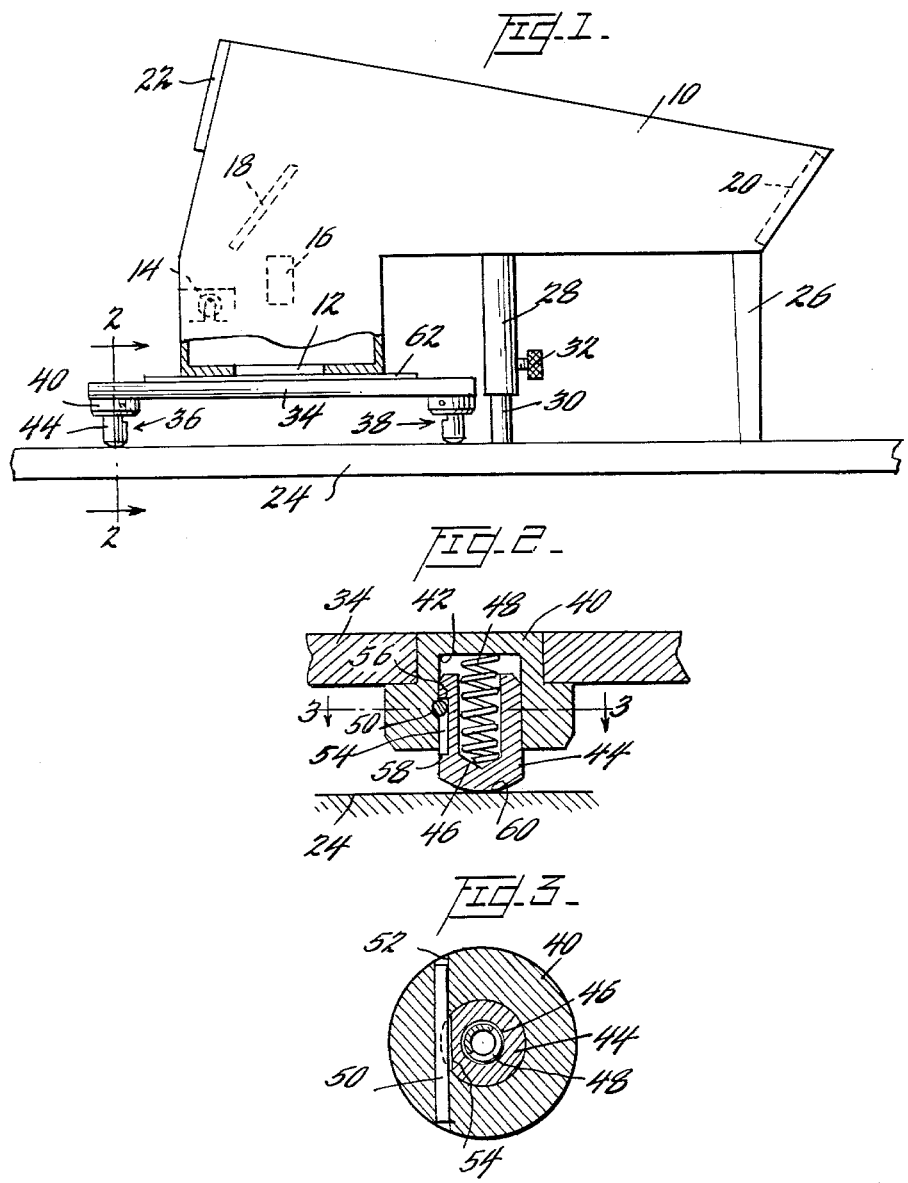
INVENTOR
Ralph R. Shaw,
BY Minegades & Douglas
ATTORNEYS 3,229,573
PLATFORM FOR OPAQUE PROJECTOR
Ralph R. Shaw, New Brunswick, N.J.
(P.O. Box 5426, Honolulu, Hawaii 96822)
Filed May 12, 1964, Ser. No. 366,860
5 Claims. (Cl. 88—24)

This invention relates generally to opaque projection apparatus, and in particular to a novel copy holder for use with such apparatus.

This invention is particularly directed to the projection of material from books, manuscripts, and other like material of variable thickness. Proper projection of this type of material raises peculiar and specific problems not normally encountered when projecting simple, flat, two-dimensional material. In particular, focussing the material to be projected properly is of utmost, critical importance. While older and other opaque projectors are equipped with special copy boards and focussing equipment to alleviate this problem, it is the intention here to eliminate the need of such complicated and expensive devices for the sake of economy and ease of operation. The solution of the problem includes the use of a simple box projector having a downwardly exposed aperture therein, said aperture being permanently fixed at proper focal depth with respect to the lens of said projector. In addition, a completely independent copy platform, which is the subject matter of the present invention, is used therewith, and is structured so as to place copy material directly against the downwardly exposed aperture of the opaque copy projector.

This type of platform is highly desirable so as to avoid any movement of the projector while projecting copy from different books and manuscripts.

It is therefore the principal object of this invention to provide an independent copy board for use with an opaque projector.

It is another object of the invention to provide a copy board of the character described which is vertically adjustable with respect to said opaque projector.

Yet another object of the invention is to provide a copy board for use wtih an opaque projector which is equipped with individually and independently adjustable legs for supporting copy material in proper relationship with the opaque projector.

Finally, it is an object of this invention to provide a copy board for use with an opaque projector that is low in cost of construction, and of optimum simplicity in use.

Other objects and advantages of this invention will become readily apparent by reference to the following specification and drawings, in which:

FIG. 1 is a side elevational view of the invention in use with a simple opaque projector;

FIG. 2 is a fragmentary sectional view taken along lines 2—2 of FIG. 1;

FIG. 3 is a sectional view taken along lines 3—3 of FIG. 2.

Referring now to the drawings by reference character, there is shown a simple opaque projector 10 having a downwardly exposed aperture 12, light source 14, lens 16, reflecting mirrors 18 and 20, and view screen 22. Projector 10 is supported on a flat surface 24 by means of rear legs 26 and front legs 28, which are located forwardly of the center of gravity of projector 10. Each front leg 28 is independently adjustable with respect to surface 24 by means of tubular insert 30 and thumb screw 32. The invention comprises a work supporting platform 34 having front and rear legs 36 and 38 respectively. As shown in FIGS. 2 and 3, each leg includes a stationary support 40 having a downwardly directed counterbore 42 therein, and a movable leg element 44 mounted within counterbore 42. Leg element 44 has a counterbore 46 therein for receiving a resilient spring element 48 which urges leg element 44 and support 40 apart. Leg element 44 is retained within counterbore 42 by means of a retaining pin 50 which is mounted within transverse bore 52 of support 40. Pin 50 cooperates with facing 54 which is cut from leg element 44. The upper and lower limits of face 54, 56 and 58 respectively, cooperate with retaining pin 50 in limiting vertical movement of leg element 44. In addition, leg element 44 may be rounded at 60 to prevent disfiguration or marring of surface 24.

To operate the device, platform 34 is removed from its position beneath aperture 12 by pressing down on the upper surface of said platform and sliding the platform back and away from aperture 12. The material to be projected, such as manuscript 62, is then placed on the top of platform 34. The platform with manuscript 62 on it is again placed beneath aperture 12 by pressing the platform down, sliding it beneath aperture 12, and then releasing said platform so that manuscript 62 is urged against aperture 12 by platform legs 36 and 38. Proper seating of manuscript 62 against aperture 12 is assured by the novel construction of platform 34, as each leg element 44 is vertically positioned by its spring 48. Thus, any possible irregularities, in surface 24 or in the position of projector 10, are overcome as each spring 48 independently urges each corner of the copy board into proper alignment with aperture 12. Furthermore, lens 16 is permanently fixed with respect to aperture 12, perfect focussing of the material to be projected is assured by the independent supports of platform 34. If bulkier materials such as books, are to be projected, the vertical height of aperture 12 may be adjusted by use of inserts 30 and thumb screws 32 mounted on front legs 28 of projector 10. In the alternative, a different work supporting platform may be used which has an upper surface which is lower to surface 24. Finally, the same platform 34 may be provided with longer or shorter front and rear legs depending on the thickness of the copy to be projected.

It may occur that lens 16 will not always be properly focussed with respect to mirrors 18 and 20, and viewscreen 22, due to movement of projector 10 from place to place. Therefore, it is anticipated that a small adjustment mechanism (not shown) may be provided for use with lens 16 to overcome this possible deficiency.

It is evident from the foregoing that I have invented a new and useful device for use with an opaque projector which is extremely simple and easy to use. However, I am not to be limited to the particular construction of my invention as shown and described herein, except as may be limited by the following claims.

I claim:

1. In combination, an opaque projection apparatus comprising a downwardly exposed aperture, the lower plane of said aperture forming a planar surface, a light source, a lens, mirrors, and a view screen, said planar surface located at the lower focal point of said lens, and a platform for supporting material to be projected comprising a generally rectangular board having independently resilient legs, said legs urging the upper surface of material to be projected into a plane coincident with said planar surface of the undersurface of said aperture, said platform having an area substantially larger than the area of said undersurface of the aperture, said resilient legs being located exteriorly of the periphery of said undersurface, in a horizontal frame of reference, and said platform horizontally movable in any direction with respect to said aperture so that any portion of the upper surface of said platform may be placed beneath said aperture.

2. The combination of claim 1, wherein said resilient legs comprise an upper portion having a counterbore therein, a lower portion movably receivable within said upper portion, spring means urging said portions apart, and stop means limiting vertical movement of said portions.

3. The combination of claim 1, wherein said board is provided with bores at each corner thereof for receiving said resilient legs, said legs removably secured within said bores.

4. The device of claim 1, wherein said platform is provided with bores for snugly receiving said resilient legs, each of said legs comprising a first tubular member, stationary with respect to said board, having a downwardly exposed counterbore therein, a second tubular member, vertically movable within said counterbore, and having an upwardly directed second counterbore therein, spring means fitted within said second counterbore urging said tubular members apart, and stop means limiting vertical travel of said movable member.

5. The device of claim 4, wherein said stop means comprises a pin mounted transversely within said stationary tubular member and a channel, cut transversely of the outer face of said movable, tubular member, said channel having a vertical dimension less than that of said movable, tubular member, said pin cooperating with said channel on the face portion thereof to limit vertical movement of said rectangular board.

References Cited by the Examiner
UNITED STATES PATENTS

| | | | |
|---|---|---|---|
| 2,578,106 | 12/1951 | Taylor | 88—24 |
| 2,583,409 | 1/1952 | Briscoe et al. | 88—24 |
| 2,852,883 | 9/1958 | Walsh | 248—188 |

NORTON ANSHER, *Primary Examiner.*

VANCE A. SMITH, *Assistant Examiner.*